United States Patent
Pignolo

(10) Patent No.: US 9,531,254 B2
(45) Date of Patent: Dec. 27, 2016

(54) METHOD AND APPARATUS FOR CONTROLLING A START-UP SEQUENCE OF A DC/DC BUCK CONVERTER

(71) Applicant: ST-Ericsson SA, Plan-les-Ouates (CH)

(72) Inventor: Philippe Pignolo, Crolles (FR)

(73) Assignee: OPTIS CIRCUIT TECHNOLOGY, LLC, Plano, TX (US)

(*) Notice: Subject to any disclaimer, the term of this patent is extended or adjusted under 35 U.S.C. 154(b) by 0 days.

(21) Appl. No.: 14/426,761

(22) PCT Filed: Aug. 15, 2013

(86) PCT No.: PCT/EP2013/067070
§ 371 (c)(1),
(2) Date: Mar. 9, 2015

(87) PCT Pub. No.: WO2014/037204
PCT Pub. Date: Mar. 13, 2014

(65) Prior Publication Data
US 2015/0249382 A1    Sep. 3, 2015

Related U.S. Application Data

(60) Provisional application No. 61/744,837, filed on Oct. 3, 2012.

(30) Foreign Application Priority Data

Sep. 10, 2012 (EP) .................................... 12306089
Apr. 6, 2013 (EP) .................................... 13162641

(51) Int. Cl.
*H02M 1/36* (2007.01)
*H02M 3/158* (2006.01)

(52) U.S. Cl.
CPC ............... *H02M 1/36* (2013.01); *H02M 3/158* (2013.01)

(58) Field of Classification Search
CPC ........ H02M 1/36; H02M 3/155; H02M 3/156; H02M 3/157; H02M 3/158; H02M 2003/1566; G05F 1/44; G05F 1/56; G05F 3/135; G05F 3/155
(Continued)

(56) References Cited

U.S. PATENT DOCUMENTS 8,456,867 B1 * 6/2013 Karlsson ................. H02M 1/36
323/901
2005/0088212 A1 * 4/2005 Leith ....................... H02M 1/36
327/198

(Continued)

OTHER PUBLICATIONS

International Search Report issued in corresponding International application No. PCT/EP2013/067070, date of mailing of report Dec. 10, 2013.

*Primary Examiner* — Adolf Berhane
(74) *Attorney, Agent, or Firm* — The Danamraj Law Group, P.C.; Thomas L. Crisman; Kenneth A. McClure

(57) ABSTRACT

A method of controlling a start-up sequence of a DC/DC Buck converter includes continuously comparing the Buck converter's output voltage with an internal reference voltage and continuously monitoring for a Buck converter start-up signal. If the output voltage is greater than the reference voltage when a Buck converter start-up signal is detected, the Buck converter is switched off and an output capacitor of the Buck converter is discharged through a pull-down unit until the output voltage substantially equals the internal reference voltage and then restarting the Buck converter.

12 Claims, 5 Drawing Sheets

(58) Field of Classification Search
USPC ... 363/49; 323/265, 271, 282, 283, 351, 901
See application file for complete search history.

(56) References Cited

U.S. PATENT DOCUMENTS

| | | |
|---|---|---|
| 2005/0122088 A1 | 6/2005 | Saitoh |
| 2007/0064454 A1 | 3/2007 | Chen et al. |
| 2007/0164722 A1* | 7/2007 | Rao .................. G05F 3/262 323/315 |
| 2009/0213631 A1 | 8/2009 | Inoue |
| 2010/0008117 A1* | 1/2010 | Luthi .................. H02J 9/005 363/126 |
| 2011/0103104 A1* | 5/2011 | Zhan ............. H02M 3/33507 363/21.17 |
| 2011/0109294 A1 | 5/2011 | Larson |
| 2012/0206121 A1 | 8/2012 | Evans et al. |
| 2012/0268085 A1* | 10/2012 | Lee .................. H02M 3/158 323/234 |
| 2014/0266087 A1* | 9/2014 | Weng .................. H02M 1/36 323/265 |
| 2015/0023072 A1* | 1/2015 | Al-Shyoukh .......... H02M 1/36 363/49 |

\* cited by examiner

METHOD AND APPARATUS FOR CONTROLLING A START-UP SEQUENCE OF A DC/DC BUCK CONVERTER

This invention relates to Buck DC/DC voltage converters, and more particularly, but without limitation, to a method and apparatus for controlling a start-up sequence of a DC/DC Buck converter.

A Buck converter provides a convenient way to reduce the voltage of a DC power supply from that of, say a battery at 12V, to the low voltages required by integrated circuits, which are typically less than 1V.

Generally speaking, Buck converters employ an inductor and a capacitor to step-down an applied input voltage by relying on the inductor's reluctance to change its voltage as the applied input voltage is switched on and off repeatedly. When the input voltage is switched on, the inductor will effectively fight the current, thus providing a voltage source that charges the capacitor, and when the input voltage is switched off, the voltage across the capacitor acts on the inductor in an opposite sense to input voltage to force the current in the inductor in an opposite direction. Eventually, a steady-state regime is arrived at whereby the charging and discharging of the capacitor, and the constantly-reversing current in the inductor, sets-up an output voltage that is lower than the applied switching input voltage, thus stepping-down the input voltage to a desired level. The output voltage level, of course, depends on the values of the inductor and capacitor, the input voltage and the switching frequency, and can thus be selected to meet design requirements.

Buck converters are significantly more efficient than, say, potential dividers, which effectively dump excess power (cf. voltage) as heat, and so Buck converters find useful applications, in particular, in Integrated Circuits (IC) for wireless devices such as mobile terminal systems (e.g. cell phones, smart phones, etc.), digital media players (e.g. MP3 and MP4 players), DVD players, portable PCs, tablet PCs and so on.

Buck converters, however, suffer from a known problem of being difficult to restart on the fly, that is to say, being switched off for a few microseconds and then restarted, because they can be overstressed in such situations. Overstressing occurs when the input voltage suddenly drops to zero and is then re-applied before the capacitor has sufficiently discharged, which can give rise to a very high current magnitude that, in certain circumstances, can lead to the destruction of a connected IC.

As such, when a Buck converter is used with many ICs, control routines need to be employed that wait for a pre-specified "minimum turn-off time" before starting the Buck converter again. The purpose of the minimum turn-off time, which is typically around 1 ms, is to allow the Buck converter's capacitor to discharge to a level that will restrict the current surge upon restart to within safe parameters, thereby protecting the connected IC.

However, in real life situations, the "enable" command of an IC connected to, and which triggers the restart of, the Buck converter, can be asynchronous. In such a situation, the IC necessarily requires the Buck converter to be able to start on the fly, regardless of the output capacitor's discharge status. In these situations, the Buck converter can deliver a current that has the potential to damage the IC, and a need therefore exists to allow a restart on the fly, but without risking damaging the IC.

It is therefore an object of the invention to make it possible to safely start and/or restart a DC/DC Buck converter on the fly and/or to address one or more of the above problems. It is also an object of the invention to provide an improved and/or alternative start-up controller for a DC/DC Buck converter.

A first aspect of the present invention relates to a method of controlling a start-up sequence of a DC/DC Buck converter.

A second aspect of the present invention relates to a computer program product comprising one or more stored sequences of instructions that are accessible to a processor and which, when executed by the processor, cause the processor to carry out the steps of the method of the first aspect of the present invention.

A third aspect of the present invention relates to an apparatus, for instance an Integrated Circuit (IC), comprising means for controlling a start-up sequence of a DC/DC Buck converter in accordance with the method of the first aspect.

A fourth aspect of the present invention relates to a wireless device, e.g. among the examples given in the introduction, comprising a device according to second aspect.

A fifth aspect of the invention provides a method of controlling a start-up sequence of a DC/DC Buck converter, the method being characterised by the steps of: continuously comparing the Buck converter's output voltage with an internal reference voltage and continuously monitoring for a Buck converter start-up signal, wherein if the output voltage is greater than the reference voltage when a Buck converter start-up signal is detected, switching off the Buck converter and discharging an output capacitor of the Buck converter through a pull-down unit until the output voltage substantially equals the internal reference voltage and then restarting the Buck converter.

Suitably, the method additionally comprises the keeping the Buck converter switched on when the output voltage is less than the reference voltage.

A sixth aspect of the invention provides a DC/DC Buck converter comprising a start-up controller, characterised by: the start-up controller comprising a comparator operatively connected to, and adapted to compare a first voltage corresponding to an output voltage of the Buck converter a second voltage corresponding to an internal reference voltage, the output of the comparator providing a first input for an AND logic controller whose second input is operatively connected to a Buck converter start-up signal, wherein the AND logic controller is configured to switch off the Buck converter and to discharge an output capacitor of the Buck converter via a pull-down circuit AND logic controller's input are both in a logical state "1".

Suitably, the DC/DC Buck converter of the sixth aspect of the invention keeps the Buck converter switched on when the Buck converter's output voltage is less than the reference voltage.

Thus, the DC/DC Buck converter of the sixth aspect of the invention is configured to switch of the Buck converter and to discharge the Buck converter's output capacitor when the Buck converter's output voltage is greater than the internal reference voltage simultaneously with a Buck converter start-up signal being detected. It will also be appreciated that the first logical input of the AND logic controller goes to logical state "0" when output voltage of the Buck converter falls below the internal reference voltage, indicating that the Buck converter's output capacitor has sufficiently discharged to allow the Buck converter to be safely re-started without a deep current inversion.

Suitably, the invention enables a DC/DC Buck converter to be re-started on the fly, without the risk of a deep current inversion. Suitably, the output voltage of the Buck converter is maintained at a non-zero value during re-starting of the Buck converter.

Suitable embodiments of the invention provide that if the start-up of the Buck converter might be dangerous, for example, if the output capacitor is charged too much, then the capacitor is discharged with the help of the pull-down unit. As soon as the state of the system is safe, that is to say, when the charge status of the output capacitor falls below a certain value, determined with reference to the output voltage relative to the internal reference voltage, then the invention enables the Buck converter to start. Suitably also, if the state of the system is safe when a start-up is requested, then the invention is configured to allow the Buck converter to be restarted without first discharging its output capacitor.

Embodiments of the invention shall now be described, by way of example only, with reference to the accompanying drawings in which.

Figure 6:
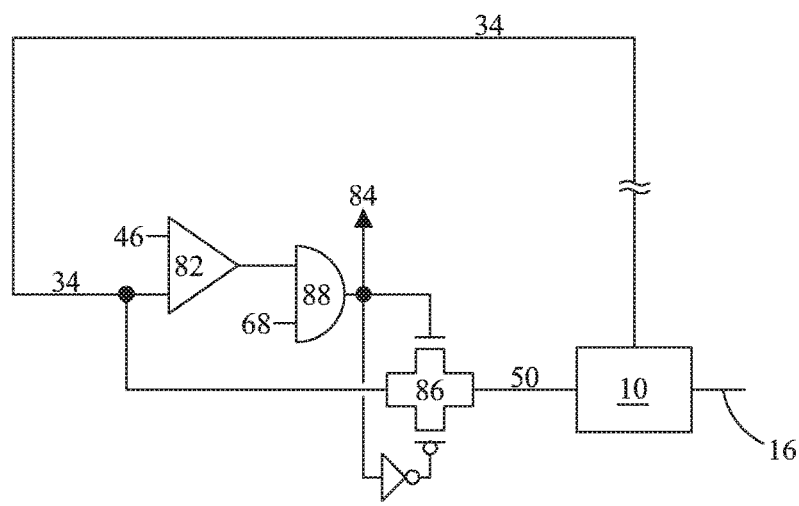
FIG. 6 is a schematic circuit diagram of a DC/DC Buck converter in accordance with the invention.
Figure 7:
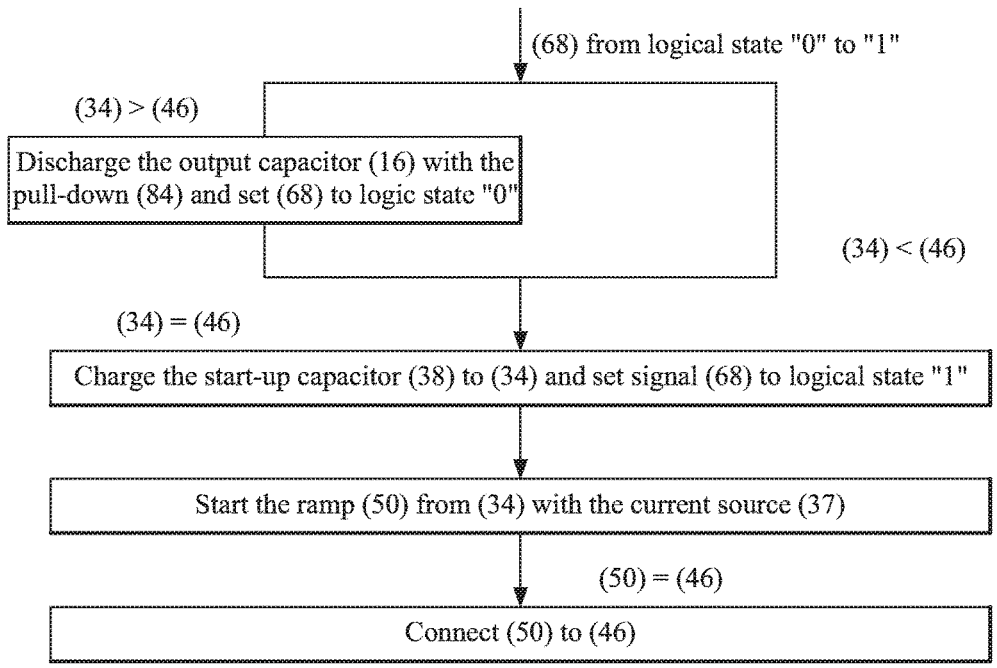
FIG. 7 is a flow chart illustrating steps of a start-up sequence according to embodiments of the invention.
Figure 8:
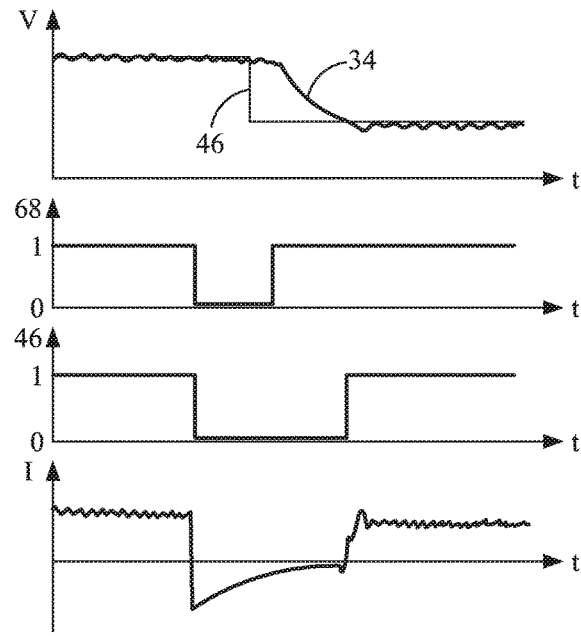
Figure 9:
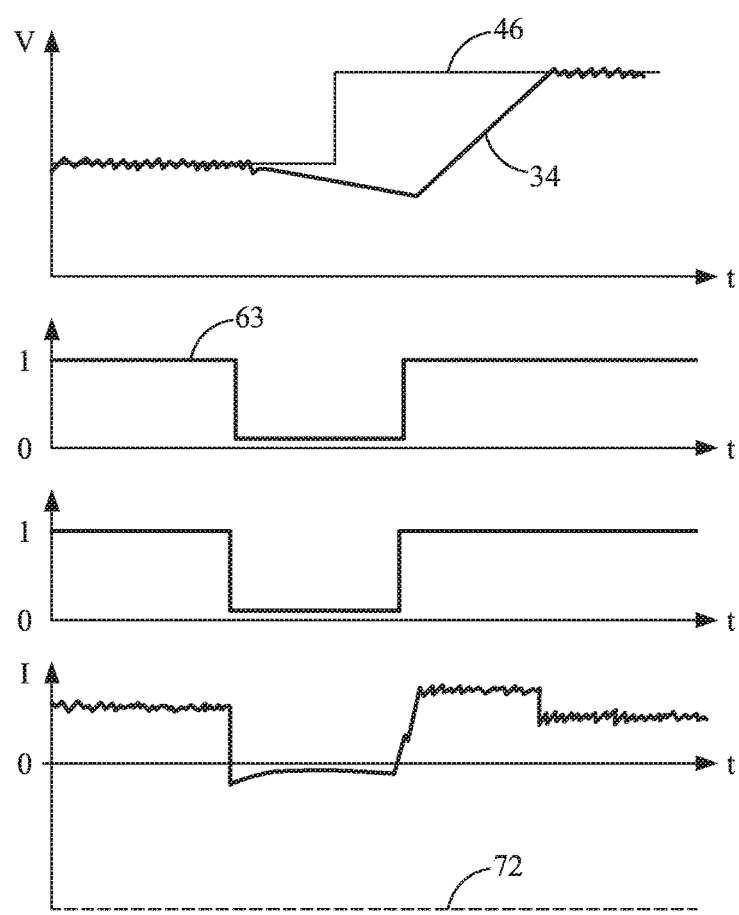

FIG. 8 is a graph showing the current inside the coil of the DC/DC Buck converter of FIG. 6, as a function of time during the start-up sequence shown in FIG. 7, specifically upon receipt of a start-up command on the fly; and FIG. 9 is a graph showing the current inside the coil of the DC/DC Buck converter of FIG. 6, as a function of time during a start-up sequence on the fly, specifically upon receipt of a start-up command on the fly.

Figure 1:
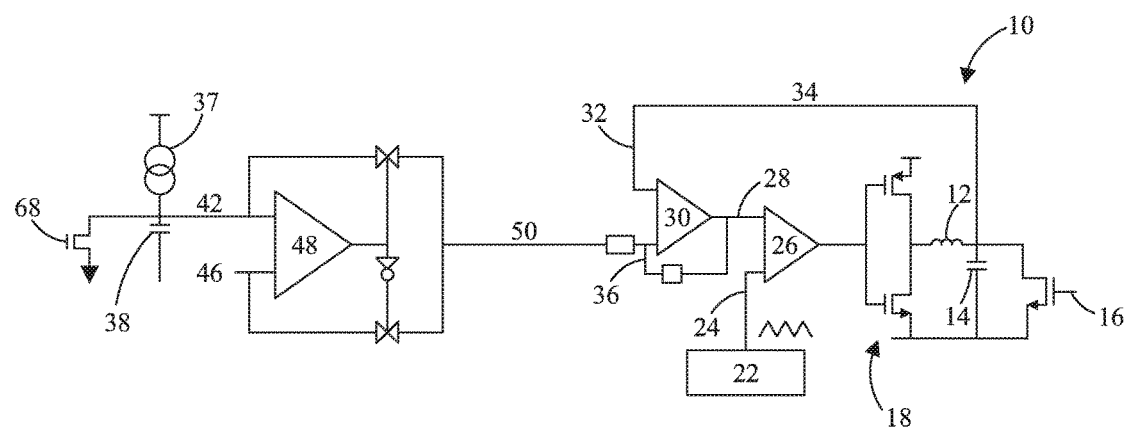
FIG. 1 is a schematic circuit diagram of a known DC/DC Buck converter.
Figure 2:
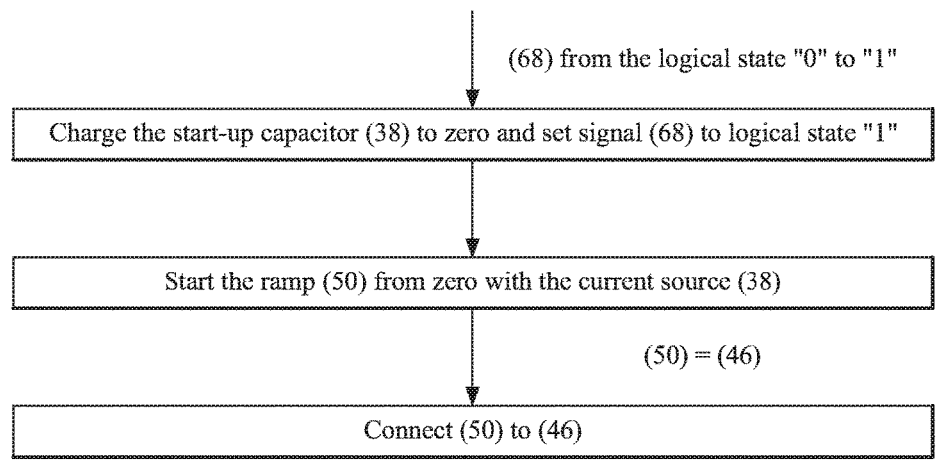
FIG. 2 is a flow chart illustrating the steps of a conventional start-up sequence for a Buck converter as shown in FIG. 1.

Referring to FIG. 1, a known DC/DC Buck converter 10 comprises an inductor coil 12 wired in series, and a capacitor 14 wired in parallel with an output 16 and an input 18. The input 18 is essentially a switching mechanism 20 that delivers a pulsed input voltage. The pulsing of the input voltage is generated by a ramp generator that feeds into one input 24 of a comparator 26, with the other input 28 being connected to the output of a second comparator 30. The second comparator 30 is connected, at one input 32, to the output voltage 34 of the converter 10, and at its other input 36 to a voltage generator that is driven by a current source 37. The current source 37 is connected to an input capacitor 38 to provide an internal reference voltage 42.

Figure 3:
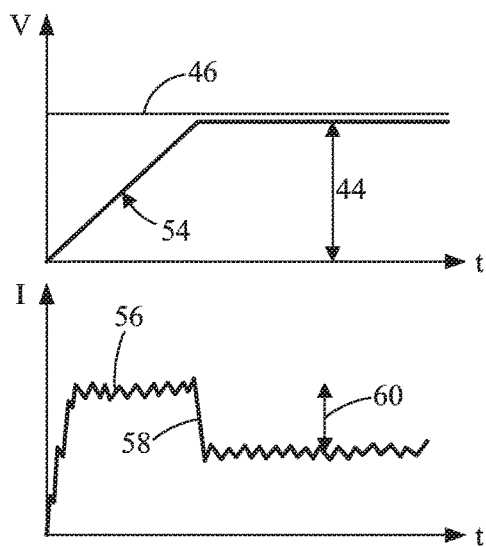
FIG. 3 is a graph illustrating the current inside the coil of the DC/DC Buck converter of FIG. 1 as a function of time during the start-up sequence of FIG. 2.

As can be seen from FIG. 3, the Buck converter's internal reference voltage 42 is generated as a ramp going from zero to a finite voltage 44. The internal reference voltage 42 is combined with a fixed voltage value 46 in a combining circuit 48 (as shown in FIG. 1) to generate an output reference voltage 50 as follows:

At the beginning of the start-up phase 52, the output reference voltage 50 is given by internal reference voltage 42. As soon as the internal reference voltage 42 reaches the fixed voltage value 46, the output reference voltage 50 is equal to the fixed voltage value 46. A such, during the start-up phase, the reference voltage seen internally, that is to say, the internal reference voltage 50, is a ramp 54 starting from zero volts with a fixed slope until it equals the fixed voltage value 46.

Referring now to the lower portion of FIG. 3, during the output capacitor 24 loading phase 58, the output current 56 is sunk 60 by the power stage and thus the current inside the coil 12 of the Buck converter 10 is dependent on the ramp slope 54, and is given by the product of the capacitor's value 14 and the slope 54.

As shown by the curves of FIG. 3, the current 56 inside the coil 12 and thus the current output from the power stage, does not have a deep current inversion during the start-up phase 58. Hence, there is only little, if no power stage overstress.

Unfortunately this is not true when the Buck converter 10 is restarted: the output voltage 34 is not around zero because the output capacitor 14 is not fully discharged when this happens, and so the Buck converter 10 massively discharges the output capacitor 14 in order to force the output voltage 34 around zero.

Figure 4:
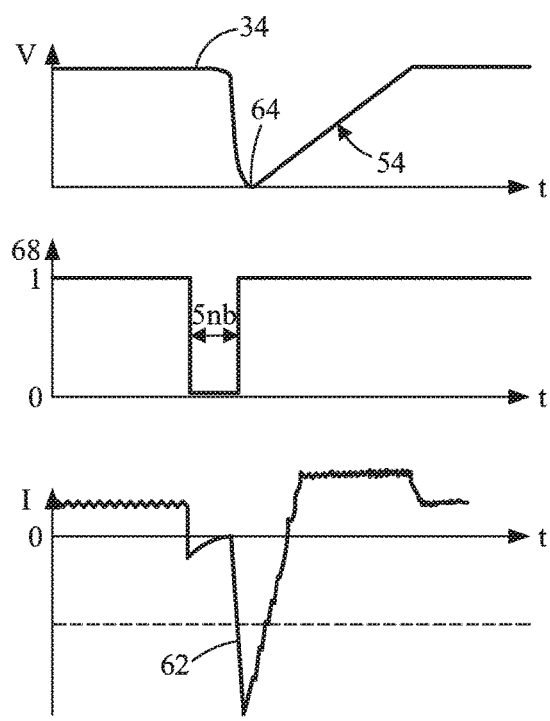
FIG. 4 is a graph illustrating the current inside the coil of the DC/DC Buck converter of FIG. 1 as a function of time during a start-up sequence on the fly.

As shown by the curves in FIG. 4, there is therefore a deep current inversion 62 inside the coil 12 during a restart because the output voltage 34 is first forced to zero volts 64 before the start-up phase 54 is activated. The current inversion 62 inside the coil 14 over-stresses the power stage and can lead to its destruction. Consequently, it is not possible to perform a start-up on the fly.

Figure 5:
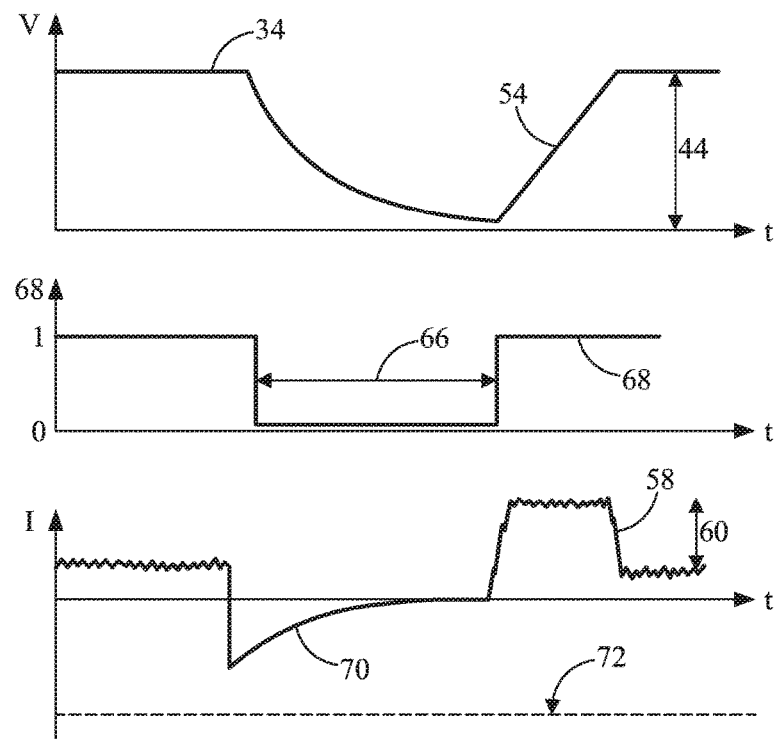
FIG. 5 is a graph illustrating the current inside the coil of the DC/DC Buck converter as a function of time during a start-up sequence on the fly, when a turn-off time is used.

It is therefore known to "soft restart" a Buck converter 10 using a pull-down resistor to discharge the output capacitor 14 to zero each time the Buck converter 10 is turned off. As shown in FIG. 5, an application is usually used to cause a device connected to the output of the Buck converter 10 to wait for a pre-specified turn-off time, which is typically 1 ms, to enable the output capacitor 14 to discharge sufficiently before the Buck converter 10 can be restarted safely by a trigger or "on" signal 68.

As shown in the lower portion of FIG. 5, is when the output capacitor 14 is allowed to discharge, there is no deep inversion inside the coil 12 and the power stage, and thus no overstress is created 70, in other words, the current inversion 70 falls within pre-specified tolerances 72.

The use of a "soft restart" such as that described above, however, is not always possible, especially in the case of Power Management Units (PMUs) such as those used in ICs for wireless devices such as mobile terminal systems, digital media players or the like, where application software requests can be asynchronous. In existing Buck converter designs 10, what happens is that re-starting the Buck converter 10 on the fly without the output capacitor 14 being completely discharged can lead to a power stage overstress 62 and possibly to an IC burnout.

An embodiment of the invention is shown in FIG. 6, which comprises a DC/DC Buck converter 10 as described previously, but with the addition of a start-up controller 80 at the Buck converter's input. The start-up controller 80 solves the problem of deep current inversion in the Buck converter's output capacitor 14, which modifies the start-up phase and safely turns on the Buck converter 10, even if it is enabled asynchronously. The start-up controller 80 improves the design performance such that the Buck converter 10 can be re-restarted on the fly from any output voltage value, and from any output capacitor 14 state.

The start-up controller comprises a comparator 82 that compares the output voltage value 34 to the fixed reference voltage 46 and operates in two different ways:

In the first case, where the output voltage 34 is higher than the fixed voltage value 46, when a Buck converter 10 start-up request occurs, that is to say, when an "on" signal 68 goes from logical state 0 to logical state 1 again, then the system discharges the output capacitor through a pull-down unit 84. The triggering of the pull-down unit 84 is effected via a bridge circuit 86 and a logical AND gate 88, whose output is only "on", when the output voltage 34 is greater than the fixed reference voltage 46, and when the Buck converter 10 start-up request signal 68 is in logical state "1". In such a situation, the start-up controller will recognise that the output capacitor 14 is not sufficiently discharged and that there is consequently a risk of a deep current inversion 62 in the Buck converter's 10 output. As such, the output capacitor 14 is discharged through the pull-down unit 84 until the output voltage 34 has dropped below a pre-specified value determined by the parameters of the comparator 82, at which point one of the inputs at the AND gate 88 will be flipped, thus disconnecting the pull-down unit 84 and allowing the Buck converter 10 to re-start normally.

It will be noted from FIG. 6, that during the pull-down phase, the Buck converter 10 is kept off. Then, as soon as the output voltage 34 reaches the internal reference 46, the system begins to load the ramp capacitor 38 to the output voltage value 34 thus enabling the Buck converter 10 to start, that is to say, the start-up request or "on" signal 68 goes from logical state "0" to logical state "1", and so the ramp starts from the output voltage value 34 with a fixed slope to reach the fixed voltage value 46.

By doing this, the system avoids the need to fully discharge the output capacitor 14 before starting the Buck converter 10 again, which can be done by changing the state of an internal control signal 68 from logical state "0" to logical state "1". Instead, the system adds to the charge that was present inside the ramp capacitor 38 before occurrence of the start request 68 to a charge necessary for the output voltage 34 to reach the fixed voltage value 46.

In the second case, where the output voltage 34 is less than the fixed voltage value 46 when a buck start-up request occurs, that is to say when signal 68 goes from logical state "0" to logical state "1" again, then the system loads the ramp capacitor 38 to the output voltage value 34 and then enables the Buck converter 10 to start. Thus, the system avoids the need to fully discharge the output capacitor 14 before starting the Buck converter 10 again and adds to the charge that was present inside the ramp capacitor 38 before the start request occurred.

In both cases, because there is no deep discharge of the output capacitor 14 during the start-up phase, the current driven through the power stage during the start-up sequence is not huge. It is consequently possible to safely execute a start-up on the fly, that is to say, restart the Buck converter 10, without having to wait for turnoff time 66 to elapse. It is also notable that the output voltage 34 never reaches zero during each re-start.

A typical start-up sequence according to the invention is shown in the flow chart of FIG. 7 and by the voltage and current curved of FIGS. 8 and 9 the two cases described above, respectively.

Referring to FIG. 7, the Buck converter 10 is disabled, for instance by the de-asserting of a control signal 68 from logical value "0" to logical value "1". At the same time, an internal control signal 90 is de-asserted from logical state "1" to "0". In the first case, as shown in FIG. 8, the output voltage 34 is greater than the fixed voltage value 46 when the Buck start-up request occurs, namely when signal 68 is asserted to logical value "1" again.

In the case, as shown in FIG. 9, the output voltage 34 is less than the fixed voltage value 46, when the Buck start-up request occurs.

The advantages of the invention include: enabling any Buck converter start-up on the fly; reducing start-up time because there is no forced "off" time 66 for allowing the output capacitor 14 to discharge; and the output voltage 34 does not fall to zero during start-up.

The present invention can also be implemented in software, say, as part of a computer program product, which comprises all the features enabling the implementation of the methods described herein, and which, when loaded in an information processing system, is able to carry out the method of the invention. Where a computer program is used or implied herein, it can mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage.

Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above.

Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of controlling a start-up sequence of a DC/DC Buck converter, the method comprising:

continuously comparing an output voltage of the Buck converter with an internal reference voltage;

continuously monitoring for a Buck converter start-up signal; and if the output voltage is greater than the internal reference voltage when the Buck converter start-up signal is detected, switching off the Buck converter and discharging an output capacitor of the Buck converter through a pull-down unit until the output voltage substantially equals the internal reference voltage and then restarting the Buck converter.

2. The method of claim 1, further comprising keeping the Buck converter switched on when the output voltage is less than the internal reference voltage.

3. A DC/DC Buck converter comprising,
a start-up controller including a comparator configured to compare an output voltage of the Buck converter with an internal reference voltage, an output of the comparator providing a first input for an AND logic controller whose second input is operatively connected to a Buck converter start-up signal, wherein an output of the AND logic controller is configured to switch off the Buck converter and to discharge an output capacitor of the Buck converter via a pull-down circuit when the AND logic controller's input are both in a logical state "1".

4. The DC/DC Buck converter of claim 3, wherein the output of the comparator connected to the first logical input of the AND logic controller goes to logical state "0" when output voltage of the Buck converter falls below the internal reference voltage.

5. The DC/DC Buck converter of claim 3, further comprising an inductor coil wired in series, and a capacitor wired in parallel with, an output and an input, the input comprising switching means comprising a ramp generator and a comparator together being configured to deliver a pulsed input voltage from a voltage generator that is driven by a current source.

6. The DC/DC Buck converter of claim 5, wherein the current source is connected to an input capacitor to provide the internal reference voltage.

7. The DC/DC Buck converter of claim 3, further comprising a combining circuit for combining the internal reference voltage with a fixed voltage value to generate an output reference voltage.

8. The DC/DC Buck converter of claim 3, wherein the start-up controller comprises a bridge circuit and a logical AND gate, whose output is only "on", when the output voltage is greater than the fixed reference voltage, and when the Buck converter start-up request signal is in logical state "1".

9. The DC/DC Buck converter of claim 8, wherein the Buck Converter's output capacitor is discharged through the pull-down unit until the output voltage has dropped below a pre-specified value.

10. The DC/DC Buck converter of claim 9, wherein the pre-specified value is determined by parameters of the comparator.

11. The DC/DC Buck converter of claim 8, wherein while the Buck converter's output capacitor is discharged, the Buck converter is kept off, such that when the output voltage reaches the internal reference voltage, the ramp capacitor begins to load to the output voltage value.

12. The DC/DC Buck converter of claim 3, wherein if the output voltage is less than the fixed voltage value when a buck start-up request goes from logical state "0" to logical state "1", the ramp capacitor loads to the output voltage value and then the Buck converter starts.

* * * * *